Feb. 18, 1969    H. S. TOLAN, JR    3,428,140
AUTOMOTIVE FRONT WHEEL DRIVE ARRANGEMENT
Filed May 25, 1967    Sheet 1 of 2
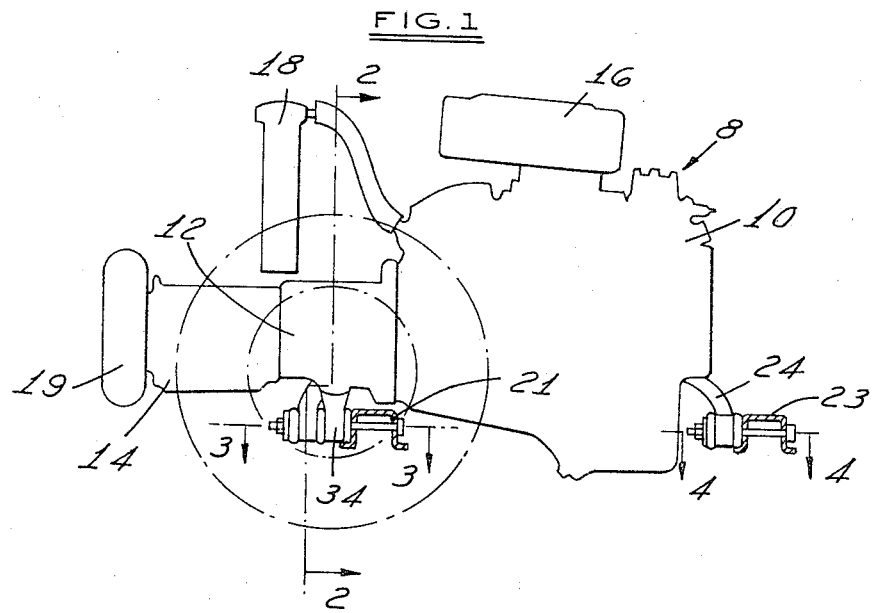
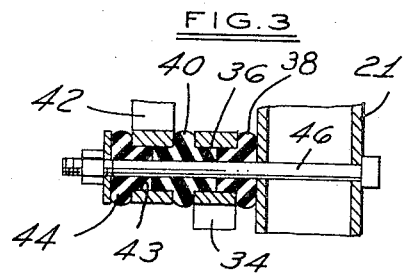
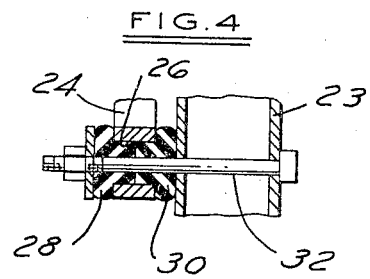
HOMER S. TOLAN, JR.
INVENTOR
BY John R. Faulkner
Clifford L. Sadler
ATTORNEYS

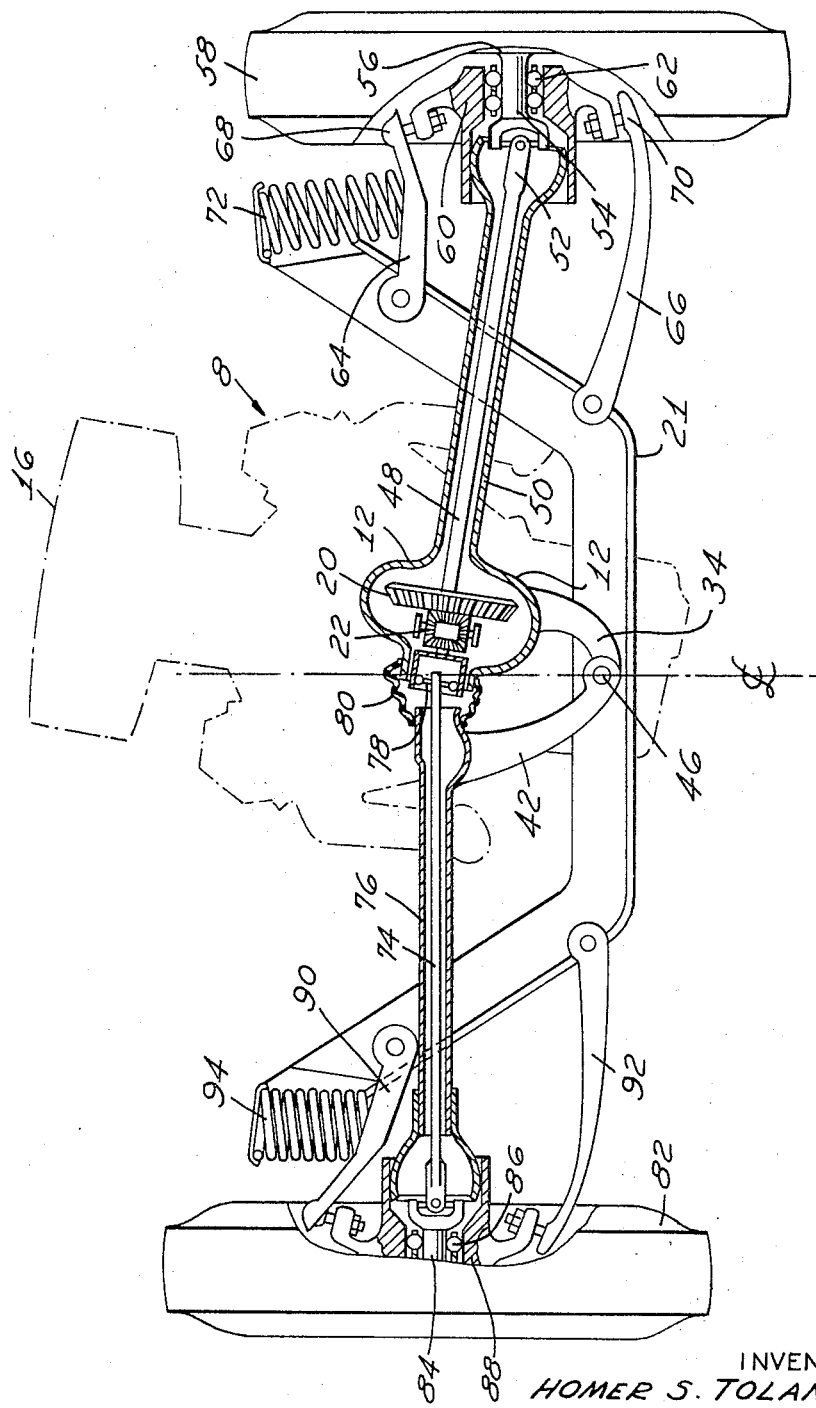

United States Patent Office 3,428,140
Patented Feb. 18, 1969

3,428,140
AUTOMOTIVE FRONT WHEEL DRIVE
ARRANGEMENT
Homer S. Tolan, Jr., Dearborn, Mich., assignor to Ford
Motor Company, Dearborn, Mich., a corporation of
Delaware
Filed May 25, 1967, Ser. No. 641,179
U.S. Cl. 180—42          10 Claims
Int. Cl. B62d 7/00; B60k 1/00, 17/00

ABSTRACT OF THE DISCLOSURE

A front wheel drive arrangement for an automobile having a pivotally mounted power plant that delivers power through left and right half shafts to the front wheels. The power plant is pivotally mounted to swing with one of the half shafts and, thereby eliminates one of the inner universal joints usually associated with front wheel drive powertrain arrangements.

*Background of the invention*

Conventional automotive front wheel drive powertrain arrangements employ a pair of half shafts each one having inner and outer universal joints for a total of four joints in the final drive train. The two inboard joints are located on opposite sides of the differential. The use of two inboard joints, in addition to being expensive, is functionally disadvantageous since the half shafts must be relatively short and must consequently induce large operating angles in all of the joints when the front wheels move up and down in response to suspension geometry requirements.

Furthermore, present front wheel drive arrangements employ engine mounting systems that require resilient attachments at three or more points of the vehicle structure. Finding space for these conventional resilient mounts is oftentimes difficult.

In view of this state of the art, it is the principal object of the present invention to provide a combination of front wheel drive components that will (1) permit the elimination of one universal joint in the final drive, (2) provide extra long half shafts, and (3) simplify power plant mountings space problems.

*Brief summary of the invention*

In the presently preferred embodiment of this invention, the engine, transmission and differential are combined in a generally in-line arrangement to provide a unit power plant or power aggregate. The engine, differential and transmission housings are rigidly interconnected and are supported on longitudinally spaced pivot mountings on the chassis frame. One half shaft is connected directly to one side of the differential and rotates about a fixed axis with respect to the power plant. The other half shaft is connected to the differential through a universal joint and moves in jounce and rebound to produce angular displacement with respect to the power plant and the one shaft.

When the first mentioned half shaft swings during jounce and rebound, the power aggregate tilts about the longitudinal axis of its mounts. The universal joint connecting the other half shaft with the differential is the sole inner universal joint. This arrangement meets the objects of the invention specified above, namely, it eliminates one of the universal joints usually associated with the front wheel drive package, permits extra long half shafts, and simplifies power plant mounting.

*Brief description of the drawings*

The many objects and advantages of the present invention will become amply apparent upon consideration of the following detailed discussion and the accompanying drawings, in which:

FIGURE 1 is a side elevational view of a front wheel drive arrangement incorporating the present invention;

FIGURE 2 is a front elevational view, partly in section, taken along section lines 2—2 of FIGURE 1; and FIGURES 3 and 4 are secitonal views of the power plant mounts and are taken along section lines 3—3 and 4—4, respectively, of FIGURE 1.

*Detailed description of the invention*

Referring now to the drawings for a more complete understanding of the present invention, the several figures of the drawing illustrate a front wheel drive arrangement for a vehicle that incorporates the presently preferred embodiment of this invention. The arrangement includes a power plant aggregate 8 that comprises an engine 10 and a transaxle assembly including a differential gear unit 12 and a transmission 14. The engine 10, the differential 12 and transmission 14 are rigidly connected. As seen in FIGURES 1 and 2, the air cleaner 16 and radiator 18 of the engine are outlined. In FIGURE 1, the fluid torque convertor for the transmission 14 is indicated by reference numeral 19.

By means of concentric shafts (not shown), the output of the engine 10 passes through the differential 12 and transmission 14 to the torque convertor 19. The convertor 19 is connected to the input of the gearing in the transmission 14 which, in turn, has its output connected to the ring gear 20 of the differential 12 by means of the usual pinion. Ring gear 20 is connected to differential gearing 22 of conventional design.

The power plant aggregate 8 is supported on frame cross members 21 and 23 of the motor vehicle chassis by means of the pivotal mountings illustrated in FIGURES 3 and 4. As seen in FIGURES 1 and 4, a rigid bracket 24 extends downwardly from the rear end of the engine 10 and has an eye portion 26 into which rubber bushings 28 and 30 are fitted. A pivot bolt 32 extends through the frame member 23 and provides a cantilevered pivotal support for the bracket 24 and the rear of the power plant 8.

A rigid arm 34 depends from the differential 12 and has an eye portion 36 that encloses rubber bushings 38 and 40. A second arm or bracket 42 supports a portion of the suspension structure and will be described in greater detail later. An eye 43 at the end of the arm 42 surrounds a bushing 44. A cantilever pin 46 extends through the frame member 21 and pivotally supports the bracket 34 and the forward end of the power plant 8.

A right-hand axle half shaft 48 is connected to a side gear of the differential gearing 22 and extends laterally therefrom. The half shaft 48 is contained within a rigid housing 50 that is rigidly connected to the differential housing 12 or integral with the power plant aggregate 8. The universal joint 52 connects the outer end of the half shaft 48 with a shaft portion 54 of a wheel hub 56. A road wheel 58 is secured to the hub 56 and is rotatably supported by bearings 62 contained within a wheel bearing housing 60.

Upper and lower laterally extending suspension arms 64 and 66 have their inner ends pivotally connected to the frame cross member 21 and their outer ends joined to the wheel bearing housing 60 by upper and lower ball joint assemblies 68 and 70. A coil spring 72 is interposed between the upper suspension arm 64 and the frame member 21. The arms 64, 66 position the wheel 58 and determine its jounce and rebound path. The spring 72 provides for the resilient support of the chassis upon the wheel.

At the left side of the vehicle, as seen in FIGURE 2, a half shaft 74 is contained within a cylindrical housing 76. The inner end of the half shaft 74 is joined to the differential gearing 22 by means of a universal joint 78. A flexible boot seal 80 covers the inner joint 78 and the gap between the inner end of the cylindrical housing 76 and the differential housing 12. The arm or bracket 42 is affixed to the inner end of the shaft housing 76 and supports it for pivotal movement about the pivot pin 46.

The structure at the outer end of the left half shaft 74 is similar to that of the right-hand side. The wheel 82 is rotatably supported by means of a spindle shaft 84 that is journalled in bearings 86. The bearings 86 are supported within a bearing housing 88. Upper and lower suspension arms 90 and 92 connect the bearing housing 88 with the frame cross member 21. A coil suspension spring 94 is interposed between the upper arm 90 and the left outer end of the frame cross member 21.

*Operation*

During vehicle operation, the wheels 58 and 82 encounter irregularities in the road which cause them to traverse vertical jounce and rebound paths. When the left wheel 82 moves up and down, the shaft 74 will pivot about the center of the inner universal joint 78 which lies on the centerline of the vehicle. At the same time the shaft housing 76 will pivot with the shaft 74 about the axis of the pivot bolt 46 supporting bracket 42.

The path of the wheel 82 is determined by the geometry of the suspension arms 90, 92 and the instantaneous center of these arms does not coincide with the pivot center of joint 78. To accommodate the wheel movement, the inner universal joint 78 is of the type that permits longitudinal displacement as well as angular movement. A so-called "pot" type joint meets such a requirement.

When the right wheel 58 moves vertically, the shaft 48 and its surrounding housing 50 will be correspondingly angularly displaced. Because the shaft housing 50 is rigidly connected to the differential housing portion of the power plant 8 and because the power plant 8 is pivotally mounted by the pins 32 and 46, vertical movement of the wheel 58 will cause the power plant 8 to pivot about the axis passing through the pins 32 and 46.

The movement of the wheel 58 is determined by the geometry of the suspension arms 64 and 66. As is the case on the left-hand side, the instantaneous center of the arms 64, 66 does not coincide with the pivot axis (bolt 46) of shaft 48 and housing 50. In order to accommodate the discrepancy in pivot centers, the bearing 62 must be of a type permitting slight axial displacement.

The front wheel drive arrangement of this invention provides half shafts that have the longest possible effective length. This is one of the three objectives set forth in the introduction. By pivotally mounting the power plant 8, an inner universal joint is eliminated between the right shaft 48 and the differential 12. The mounting of the power plant is simplified because only two spaced apart pivot mounts are required. Long half shafts are permitted as already noted.

The foregoing description presents the presently preferred embodiment of this invention.

I claim:

1. A wheel drive arrangement for a motor vehicle having a chassis frame, an integrated power plant having power output means, pivot means pivotally supporting said power plant on said frame, said pivot means having a longitudinal pivot axis, left and right road wheels positioned laterally of said power plant, a wheel support means rotatably supporting each of said wheels, suspension means interconnecting said wheel support means and said chassis frame and constructed to guide said wheels along jounce and rebound paths, a first shaft means extending laterally from said power plant and having its outer end connected to one of said wheels, joint means connecting the inner end of said shaft means with said power output means, a second shaft extending laterally from said power plant and having its outer end connected to the other of said wheels, said second shaft being connected to said power output means, means constructed to support said second shaft for rotation about an axis fixed with respect to said power plant.

2. A wheel drive arrangement for a motor vehicle according to claim 1 and including:
said power plant comprising an engine and transaxle means, said power output means forming a part of said transaxle means.

3. A wheel drive arrangement for a motor vehicle according to claim 1 and including:
a universal joint connecting the outer end of said first shaft means with one of said wheels, a universal joint connecting the outer end of said second shaft with the other of said wheels.

4. A wheel drive arrangement for a motor vehicle according to claim 1 and including:
said power plant comprising an engine, a transmission, and a differential, said power output means forming a part of said differential, a universal joint connecting the outer end of said first shaft means with one of said wheels, a universal joint connecting the outer end of said second shaft with the other of said wheels.

5. A wheel drive arrangement for a motor vehicle according to claim 1 and including:
steering pivot means connecting said suspension means to said wheel support means and constructed to provide a substantially vertical pivot axis therebetween, a universal joint connecting the outer end of said first shaft means with one of said wheels, a universal joint connecting the outer end of said second shaft with the other of said wheels.

6. A wheel drive arrangement for a motor vehicle according to claim 1 and including:
said power plant comprising an engine, a transmission, and a differential, said power output means forming a part of said differential, steering pivot means connecting said suspension means to said wheel support means and constructed to provide a substantially vertical pivot axis therebetween, a steering joint connecting the outer end of said first shaft means with one of said wheels, a steering joint connecting the outer end of said second shaft with the other of said wheels.

7. A wheel drive arrangement for a motor vehicle according to claim 1 and including:
a universal joint connecting the outer end of said first shaft means with one of said wheels, a universal joint connecting the outer end of said second shaft with the other of said wheels, said inner joint means having means permitting axial displacement between said first shaft means and said power output means, means permitting axial displacement between said other wheel and its wheel support means.

8. A wheel drive arrangement for a motor vehicle according to claim 1 and including:
a universal joint connecting the outer end of said first shaft means with one of said wheels, a first shaft housing situated about said first shaft means and having one end pivotally connected to said pivot means, a universal joint connecting the outer end of said second shaft with the other of said wheels, a second shaft housing surrounding said second shaft and having its inner end rigidly affixed to said power plant.

9. A wheel drive arrangement for a motor vehicle according to claim 1 and including:
said power plant comprising an engine, a transmission, and a differential, said power output means forming a part of said differential, steering pivot means connecting said suspension means to said wheel support means and constructed to provide a substantially vertical pivot axis therebetween, a universal joint connecting the other end of said first shaft means with one of said wheels, a first shaft housing situated about said first shaft means and having one end pivotally connected to said pivot means, a universal joint connecting the outer end of said second shaft with the other of said wheels, a second shaft housing surrounding said second shaft and having its inner end integral with said power plant.

10. A wheel drive arrangement for a motor vehicle according to claim 1 and including:

said power plant comprising an engine, a transmission, and a differential, said power output means forming a part of said differential, steering pivot means connecting said suspension means to said wheel support means and constructed to provide a substantially vertical pivot axis therebetween, a universal joint connecting the outer end of said first shaft means with one of said wheels, a first shaft housing situated about said first shaft means and having one end pivotally connected to said pivot means, a universal joint connecting the outer end of said second shaft with the other of said wheels, a second shaft housing surrounding said second shaft and having its inner end rigidly affixed to said power plant, said inner joint means having means permitting axial displacement between said first shaft means and said power output means, means permitting axial displacement between said other wheel and its wheel support means.

References Cited

UNITED STATES PATENTS

| | | | |
|---|---|---|---|
| 2,084,080 | 6/1937 | D'Aubarede | 180—64 |
| 3,118,515 | 1/1964 | Kraus et al. | 180—73 |
| 3,155,186 | 11/1964 | Cadmus et al. | 180—43 |

A. HARRY LEVY, *Primary Examiner.*

U.S. Cl. X.R.

180—64, 73